(12) United States Patent
Steely, Jr. et al.

(10) Patent No.: US 9,418,016 B2
(45) Date of Patent: Aug. 16, 2016

(54) METHOD AND APPARATUS FOR OPTIMIZING THE USAGE OF CACHE MEMORIES

(75) Inventors: Simon C. Steely, Jr., Hudson, NH (US); Joel S. Emer, Hudson, MA (US); William C. Hasenplaugh, Boston, MA (US)

(73) Assignee: Intel Corporation, Santa Clara, CA (US)

( * ) Notice: Subject to any disclaimer, the term of this patent is extended or adjusted under 35 U.S.C. 154(b) by 1012 days.

(21) Appl. No.: 12/974,907

(22) Filed: Dec. 21, 2010

(65) Prior Publication Data

US 2012/0159077 A1   Jun. 21, 2012

(51) Int. Cl.
*G06F 12/02* (2006.01)
*G06F 12/08* (2016.01)

(52) U.S. Cl.
CPC ........ *G06F 12/0891* (2013.01); *G06F 12/0804* (2013.01); *G06F 12/0815* (2013.01); *G06F 2212/1028* (2013.01); *Y02B 60/1225* (2013.01)

(58) Field of Classification Search
None
See application file for complete search history.

(56) References Cited

U.S. PATENT DOCUMENTS

2007/0156972 A1*  7/2007  Uehara et al. ................. 711/146
2008/0104332 A1*  5/2008  Gaither et al. ................ 711/141

OTHER PUBLICATIONS

Chow, Jim, et al., "Shredding Your Garbage: Reducing Data Lifetime Through Secure Deallocation", Stanford University Department of Computer Science, USENIX Association, 14th USENIX Security Symposium.

* cited by examiner

*Primary Examiner* — Charles Rones
*Assistant Examiner* — Ryan Dare
(74) *Attorney, Agent, or Firm* — Lowenstein Sandler LLP

(57) ABSTRACT

A method and apparatus to reduce unnecessary write backs of cached data to a main memory and to optimize the usage of a cache memory tag directory. In one embodiment of the invention, the power consumption of a processor can be saved by eliminating write backs of cache memory lines that has information that has reached its end-of-life. In one embodiment of the invention, when a processing unit is required to clear one or more cache memory lines, it uses a write-zero command to clear the one or more cache memory lines. The processing unit does not perform a write operation to move or pass data values of zero to the one or more cache memory lines. By doing so, it reduces the power consumption of the processing unit.

26 Claims, 7 Drawing Sheets

METHOD AND APPARATUS FOR OPTIMIZING THE USAGE OF CACHE MEMORIES

FEDERALLY SPONSORED RESEARCH

This invention was made with Government support under H98230-11-3-0011 awarded by the Department of Defense. The Government has certain rights in this invention.

FIELD OF THE INVENTION

This invention relates to a cache memory, and more specifically but not exclusively, to reducing unnecessary write backs of cached data to a main memory and optimizing the usage of a cache memory tag directory.

BACKGROUND DESCRIPTION

A cache memory coherency protocol is often used to ensure that when a processing core accesses a particular cache memory line, the processing core is working on the most recent version of the particular cache memory line. Write backs of cached data to the main memory require power and may affect the performance of a system when excessive write backs are needed.

A cache memory tag directory can be used to keep track of the cache memory lines. The cache memory tag directory can have modest associativity and can control many cache memories close to the processing cores. Although the cache memory tag directory is typically indexed by a hash array of the memory addresses, it is not possible for the cache memory tag directory to represent all the configurations of valid cacheable memory lines.

The cache memory tag directory controls the cache memory lines that are in the cache memories by issuing back-invalidate commands whenever a cache memory line must be evicted because it is an entry that corresponds to a cache memory line being held in one or more of the cache memories. To achieve good cache memory performance, the number of tag entries in the cache memory tag directory should be larger than the number of different cache memory lines that can be held in the union of all the cache memories controlled by the cache memory tag directory.

BRIEF DESCRIPTION OF THE DRAWINGS

The features and advantages of embodiments of the invention will become apparent from the following detailed description of the subject matter in which.

DETAILED DESCRIPTION

Figure 1:
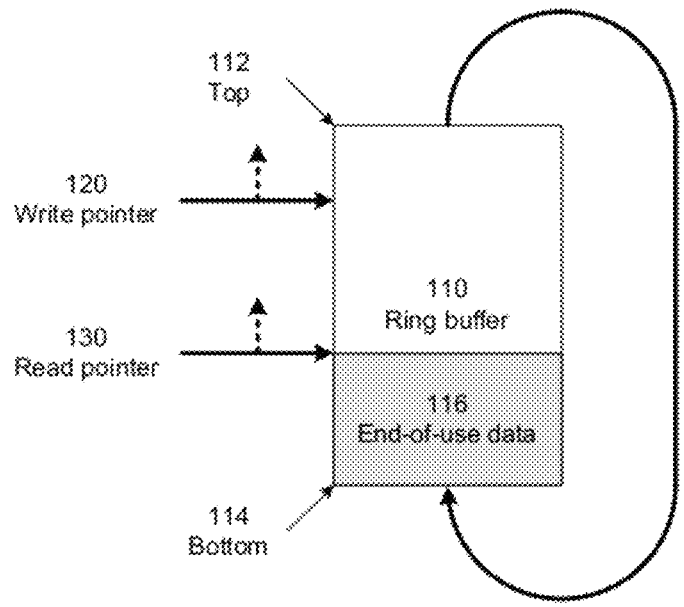
FIG. 1 illustrates a diagram of a ring buffer in accordance with one embodiment of the invention.

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

Embodiments of the invention provide a method and apparatus to reduce unnecessary write backs of cached data to a main memory and to optimize the usage of a cache memory tag directory. In one embodiment of the invention, the power consumption of a processor can be saved by eliminating write backs of cache memory lines that has information that has reached its end-of-life.

The life time of information such as data starts when the information is written into memory. Each read operation of the information continues the useful life time of the information. In one embodiment of the invention, the information is considered useless from the last read operation of the information until it is written again. The life time of the information can be obtained from, but is not limited to, a program, an application, a binary translator or any other tool that uses the information in one embodiment of the invention. By eliminating unnecessary write backs of cached information or data, the bandwidth for the necessary write backs of the processor can be increased.

FIG. 1 illustrates a diagram 100 of a ring buffer 110 in accordance with one embodiment of the invention. The ring buffer 110 illustrates a data structure that allows the elimination of unnecessary write backs of cached information in one embodiment of the invention. The ring buffer 110 may reside in, but not limited to, volatile and non-volatile memory. The data width of the ring buffer has, but not limited to, 32 bytes, 64 bytes, and any other suitable data width.

The ring buffer 110 has a write pointer 120 or head pointer that indicates where the entries of the ring buffer 110 are added. When an entry is added to the ring buffer 110, the write pointer 120 moves to the next sequential address of the ring buffer 110. The read pointer 130 or tail pointer of the ring buffer 110 indicates where the entries of the ring buffer 110 are processed or read.

After an entry is read, the read pointer 130 moves to the next sequential address of the ring buffer 110. The read information is no longer useful as it will not be read again until the next write operation. When the write pointer 120 or the read pointer 130 reach the top 112 of the ring buffer 110, they are wrapped around back to the bottom 114 of the ring buffer 110.

The end-of-use data 116 indicates that the information have already been read or processed and is no longer useful to a program or application.

If the read information is cached in one or more cache memory lines, the one or more cache memory lines are marked or indicated as having end-of-life information in one embodiment of the invention. In one embodiment of the invention, the state of the one or more cache memory lines that has end-of-life information or useless information is changed to a shared state. By doing so, the write backs of the cached end-of-life information are not performed and it eliminates unnecessary write backs since the information is no longer useful.

The ring buffer 110 illustrated in FIG. 1 is not meant to be limiting. In another embodiment of the invention, a stack is a data structure that can allow the elimination of unnecessary write backs of cached information. For example, when data is popped or removed from the stack, the data can be declared as end-of-use in one embodiment of the invention. One of ordinary skill in the relevant art will readily appreciate that other forms of data structure can also have information that can be marked as end-of-life or end-of-use. These other forms of data structure can be used without affecting the workings of the invention and shall not be described herein.

Figure 2:
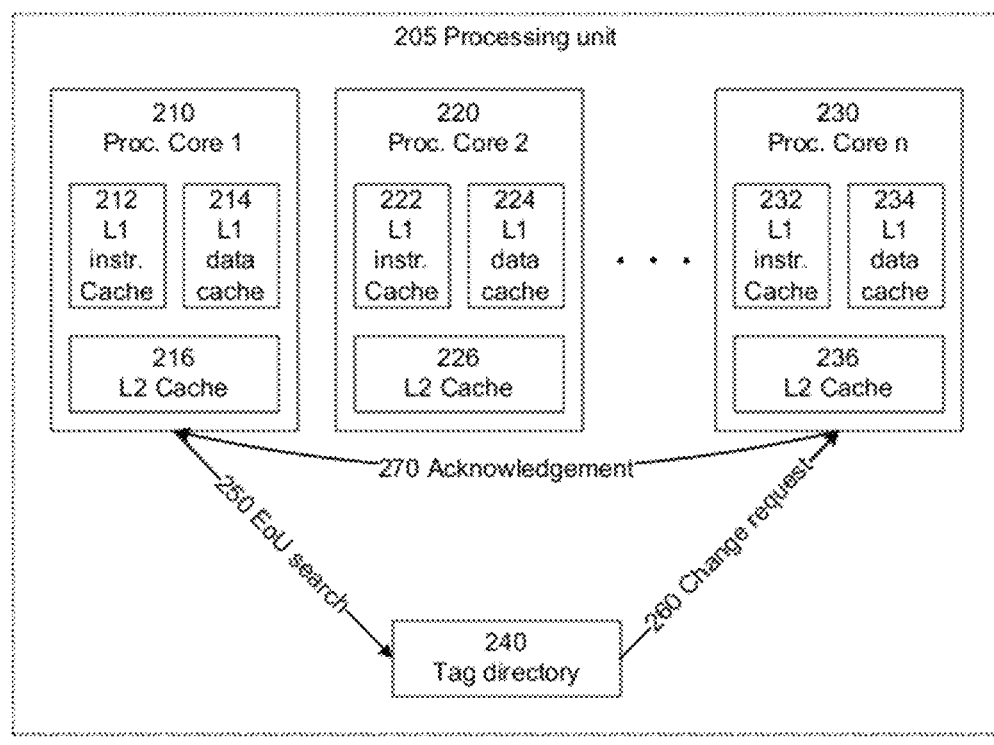
FIG. 2 illustrates a block diagram of a processing unit in accordance with one embodiment of the invention.

FIG. 2 illustrates a block diagram 200 of a processing unit 205 in accordance with one embodiment of the invention. For clarity of illustration, FIG. 2 is discussed with reference to FIG. 1. The processing unit 205 has processing core 1 210 and processing core 2 220. The processing core n 230 illustrates that there can be more than two processing cores.

The processing core 1 210 has a level one (L1) instruction cache memory 212, a L1 data cache memory 214, and a level two (L2) cache memory 216. The processing core 2 220 and the processing core n have a similar structure as the processing core 1 210 and shall not be described herein. The processing unit 205 has a cache memory tag directory 240 that keeps track of all the cache memory lines in the cache memories of the processing cores.

In one embodiment of the invention, all the cache memories of the processing unit 205 operate in accordance with the Modified, Owned, Exclusive, Shared, Invalid (MOESI) protocol. One of ordinary skill in the relevant art will readily appreciate that the processing unit 205 may also use any other cache memory coherency protocol such as the MSI and MESI protocol without affecting the workings of the invention.

FIG. 2 illustrates the operation of an end-of-use (EoU) command or instruction in one embodiment of the invention. In one embodiment of the invention, the EoU command is a command issued by a processing core that is applied to a particular cache memory line to change the state of the particular cache memory line in the cache memory hierarchy such that it will not be written back to the main memory. In one embodiment of the invention, the EoU command changes the state of the particular cache memory line to a shared state. In another embodiment of the invention, the EoU command uses a write-zero command to mark or indicate the particular cache memory line as a zero cache memory line.

For clarity of illustration, the processing core 1 210 is assumed to cache the data of the ring buffer 110. One or more cache memory lines of the L1 data cache memory 214 is storing or caching the end-of-use data 116 of the ring buffer 110. In one embodiment of the invention, when data is written to the location in the ring buffer 110 pointed to by the write pointer 120, the state of the cache memory lines that have cached the written data is set to a modified state. When the data pointed to by the read pointer 130 is read, the data can be declared as useless or end-of-use by the EoU command in one embodiment of the invention. Since the end-of-use data is not useful to any program or application, any write back requirement of the cache memory lines that have cached the end-of-use data 116 is removed or avoided in one embodiment of the invention. In one embodiment of the invention, the processing core 1 210 has logic to determine and indicate the end-of-use data 116 as useless information. The end-of-use data can be evicted from the cache memory and does not need to be written back to the main memory in one embodiment of the invention.

In one embodiment of the invention, after the processing core 1 210 has determined that it has one or more cache memory lines in the L1 data cache memory 214 that are caching useless information, it changes the state of the one or more cache memory lines to a shared state. By doing so, if the one or more cache memory lines are in a particular state that requires write back to the main memory, the processing core 1 210 changes the particular state of the one or more cache memory lines to a shared state. The shared state indicates that any eviction of the cache memory line from the cache memory hierarchy does not write back the information to the main memory.

In another embodiment of the invention, the processing core 1 210 may change to another state other than the shared state that does not require any write back to the main memory. This allows a reduction in the power consumption of the processing unit 205 as the unnecessary write backs of useless information to the main memory are avoided.

After the processing core 1 210 has changed the state of the one or more cache memory lines in the L1 data cache memory 214 that are caching useless information to the shared state, it sends an end-of-use (EoU) search request 250 to the cache memory tag directory 240. The cache memory tag directory 240 receives the EoU search request 250 and searches its entries to determine if there are any entries that correspond to the one or more cache memory lines in the L1 data cache memory 214 that are caching the useless information. The entry in the cache memory tag directory includes the memory location of the cache memory lines.

For clarity of illustration, the processing core n 230 is assumed to be caching the same useless information as the processing core 1 210. As such, the cache memory tag directory finds entries that indicate that the L1 data cache memory 234 in the processing core n 230 also has a cached copy of the useless information that is cached by the one or more cache memory lines in the L1 data cache memory 214. In one embodiment of the invention, the cache memory tag directory changes the state of the matching entries to the shared state and sends a change request 260 to the processing core n 230. In one embodiment of the invention, when there are more than one processing cores that have a cached copy of the useless information, only one of the processing core has the cached copy of the useless information in an owned state. The EoU command ensures that state of the cached copy of the useless information in the only one processing core is changed to the shared state in one embodiment of the invention.

The change request 260 indicates to the processing core n 230 that it has to change the state of the cache memory lines that are caching the same useless information to the shared state. An acknowledgement 270 is sent by the processing core n 230 to the processing core 1 210 after it has finished changing the state of the cache memory lines that are caching the useless information to the shared state.

The operations of the EoU search request 250, the change request 260, and the acknowledgement 270 illustrate one embodiment of the invention and are not meant to be limiting. The EoU command does not have to be issued by the processing core that has last read the useless information in one embodiment of the invention. For example, in one embodiment of the invention, when a first processor core reads the data pointed to by the read pointer 130, the first processor core does not issue the EoU command to declare the read data as useless. A second processor core issues the EoU command to declare the read data as useless in one embodiment of the invention. One of ordinary skill in the relevant art will readily that other mechanisms or algorithms can be used without affecting the workings of the inventions. For example, in one embodiment of the invention, a cache snoop response can be used to implement the end-of-use algorithm. In another embodiment of the invention, a special mode in the processing unit 205 can be used to implement the end-of-use algorithm. In yet another embodiment of the invention, an end-of-use instruction set can be used to implement the end-of-use algorithm.

The configuration of the processing unit 205 illustrated in FIG. 2 illustrates one embodiment of the invention and is not meant to be limiting. For example, in another embodiment of the invention, the processing unit 205 has higher levels of cache memories such as level three (L3) cache memories that are not shown in FIG. 2. In another embodiment of the invention, the processing unit 205 does not have a shared cache memory tag directory 240 and each of the processing cores has a separate cache memory tag directory.

Although defined as inaccurate, a program or application could try and read a cache memory line that it had earlier defined to be end-of-life or useless information through an EoU instruction. If this read operation is done both after the state of the cache memory line is changed to the shared state and the cache memory line has been evicted from the hierarchy, then this inaccurate subsequent read operation will obtain the data from the main memory that holds an older version of the line. Although the data is inaccurate or nonsensical, it is not a security issue if a program reads older versions of the own created data.

However, a problem may occur if the prior version of the cache memory line has information that corresponds to a different process or thread. This is because information is not allowed to be communicated between processes using stale memory locations. An operating system avoids such a problem by clearing all new pages that are allocated and given to a process. This closes the memory to memory communication channel from a prior process to a new one.

To eliminate the possibility of communication between processes using stale memory locations, the cache hierarchy marks each line or block of cache memory that are being cleared and allocated to a new process in one embodiment of the invention. In one embodiment of the invention, each cache memory line to be cleared is marked using a F flag. The F flag of each cache memory line indicates that the cache memory line is being assessed or read for the first time by a process. This allows a processing unit to differentiate between cache memory lines that have been declared as end-of-use and cache memory lines that selected to be cleared and allocated to a new process. In one embodiment of the invention, cache memory lines with an asserted F flag are written to the main memory when an eviction request is received.

Figure 3:
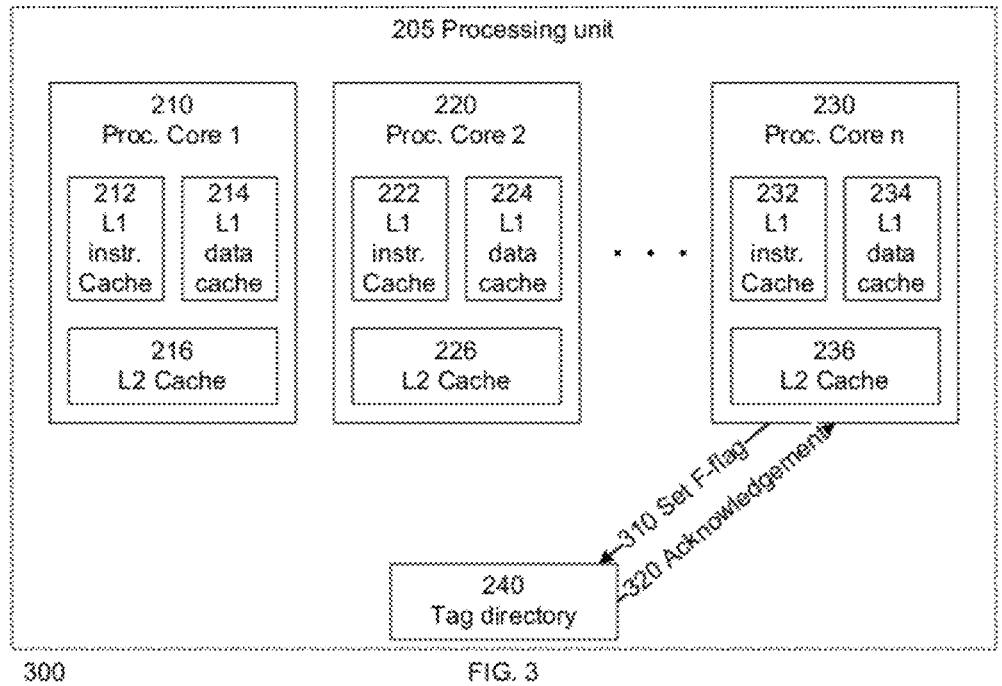
FIG. 3 illustrates an operation to mark or indicate the F flag in a processing unit in accordance with one embodiment of the invention.

FIG. 3 illustrates an operation 300 to mark or indicate the F flag in a processing unit 205 in accordance with one embodiment of the invention. For clarity of illustration, the operating system in the processing unit 205 is assumed to initiate a new process. When the operating system executing on the processing unit 205 desires to clear and allocate one or more memory pages to a new process in the processing core n 230, it sends a request 310 to set or assert the F flag of the entries of the one or memory pages in the cache memory tag directory. Each F flag of the cache memory lines of the one or more memory pages are asserted in one embodiment of the invention. After the F flag of the entries of the one or memory pages in the cache memory tag directory is set, an acknowledgement 320 that indicates that the F flag is set successfully is sent to the processing core n 230.

In another embodiment of the invention, the acknowledgement 320 is indicated to the processing core n 230 by setting a register bit and the processing core n 230 reads the register bit setting to determine whether the setting of the F flag is set successfully. In one embodiment of the invention, when a particular cache memory line is to be cleared or to be written with a data value of zeros, the instruction(s) to write the data value of zeros to the particular cache memory line is appended with the request 310 to indicate that the F flag of the particular cache memory line should be set. One of ordinary skill in the relevant art will readily appreciate that the operating system can use other ways of indicating that one or more memory pages are to be cleared and allocated for a new process. These other ways can be used without affecting the workings of the invention.

Figure 4:
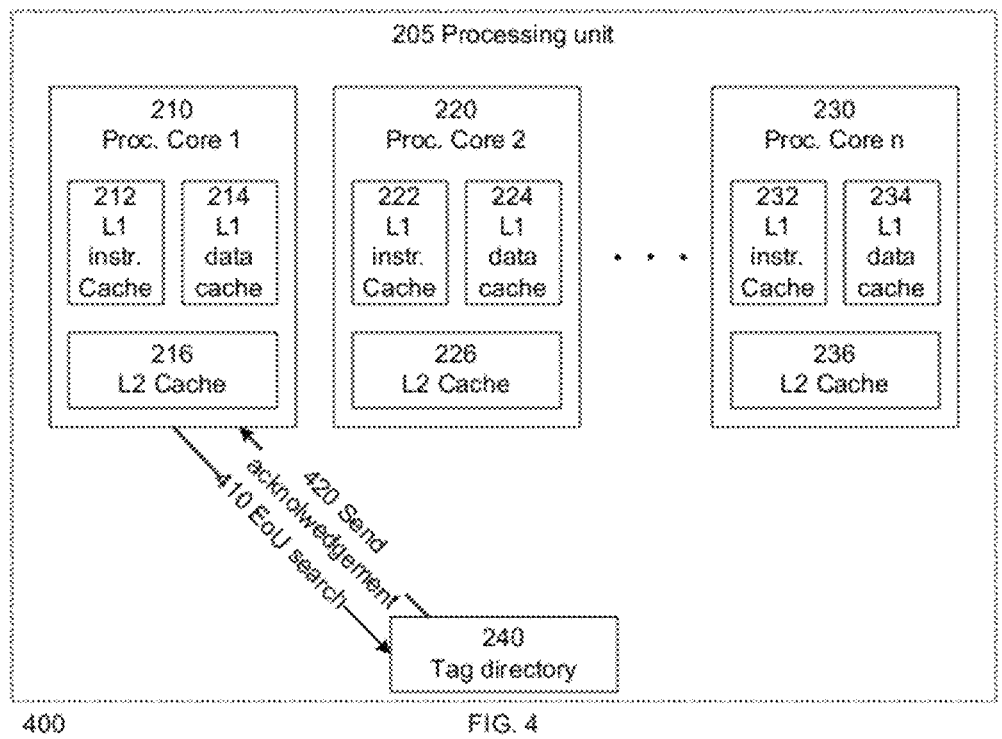
FIG. 4 illustrates an operation of an end-of-use operation and the F flag in accordance with one embodiment of the invention.

FIG. 4 illustrates an operation 400 of an end-of-use operation and the F flag in accordance with one embodiment of the invention. For clarity of illustration, the processing core 1 210 is assumed to be caching useless information in the L1 data cache memory 214 and has changed the state of the one or more cache memory lines that are caching useless information to the shared state.

The processing core 1 210 sends an EoU search request 410 to the cache memory tag directory 240 to determine if there are any entries that corresponds to the one or more cache memory lines in the L1 data cache memory 214 that are caching the useless information. For clarity of illustration, the processing core n 230 is assumed to be caching the same useless information as the processing core 1 210 and the operating system has asserted the F flag on the cache memory lines that are caching the same useless information.

When the cache memory tag directory 240 has found matching entries that indicate that the L1 data cache memory 234 in the processing core n 230 also has a cached copy of the useless information that is cached by the one or more cache memory lines in the L1 data cache memory 214, it checks the F flag associated with the cache memory lines of the L1 data cache memory 234. In this example, the cache memory lines of the L1 data cache memory 234 that caches the same useless information have an asserted F flag.

The cache memory tag directory 240 does not change the state of the cache memory lines of the L1 data cache memory 234 when they have an asserted F flag. This allows an eviction request of the cache memory lines of the L1 data cache memory 234 with an asserted F flag to write back to the main memory. The F flag is de-asserted after the eviction request is completed. If the cache memory lines of the L1 data cache memory 234 do not have an asserted F flag, it changes the state of the cache memory lines of the L1 data cache memory 234 that caches the useless information to the shared state.

The cache memory tag directory 240 sends an acknowledgement 420 to the processing core 1 210 after it finished the EoU search request 410. The F flag is associated with each cache memory line is implemented using a bit setting in one embodiment of the invention. For example, in one embodiment of the invention, each cache memory line has one bit that serves as the F flag. One of ordinary skill in the relevant art will appreciate that other ways of implementing the F flag can be used without affecting the workings of the invention.

Figure 5:
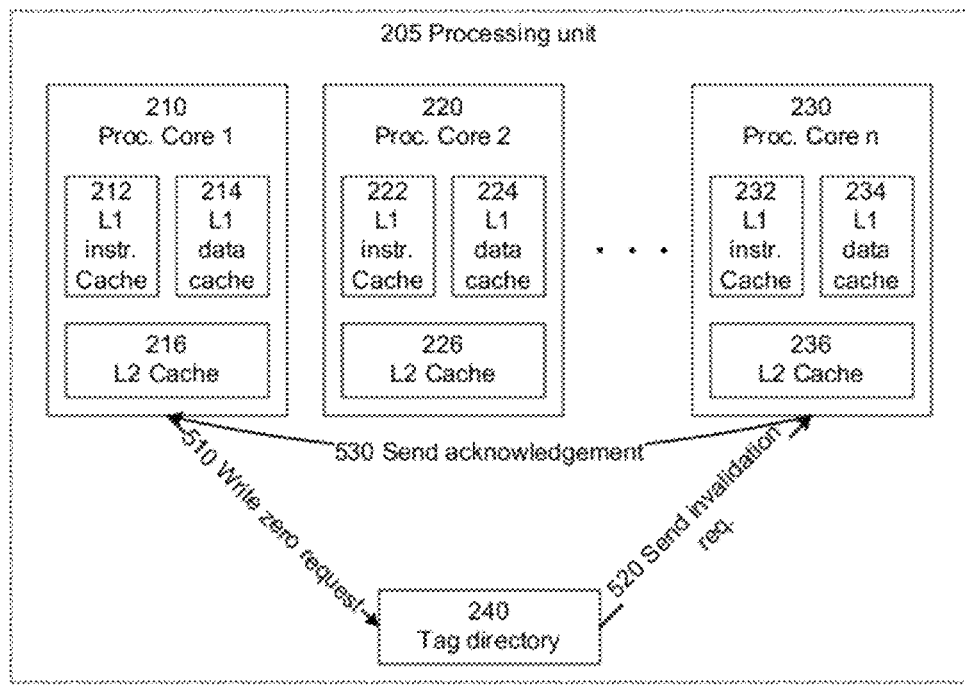
FIG. 5 illustrates an operation to perform a write-zero command in accordance with one embodiment of the invention.

FIG. 5 illustrates an operation 500 to perform a write-zero command in accordance with one embodiment of the invention. In one embodiment of the invention, when the processing unit 205 is required to clear one or more memory pages, it uses a write-zero command to clear the one or more memory pages. The processing unit 205 does not perform a write operation to move or pass data values of zero to the one or more memory pages. By doing so, it reduces the power consumption of the processing unit 205 when the memory pages are required to be cleared.

In one embodiment of the invention, the write-zero command allocates ownership of a particular cache memory line for a requesting processing core that has issued the write-zero command. The write-zero command removes all copies of the particular cache memory line in the cache memory hierarchy and creates a zero value of the particular cache memory line in the first level of cache memory in the requesting processing core. In another embodiment of the invention, the write-zero command removes all copies of a particular cache memory (that is to be cleared or set to a data value of zero) from the cache memory hierarchy and creates an entry in the cache memory tag directory with an asserted Z flag. By using the Z flag to represent cache memory lines with a data value of zeros in the cache memory tag directory, extra capacity of the cache memory tag directory can be created. This allows efficient usage of the cache memory tag directory in one embodiment of the invention In one embodiment of the invention, when a read request of a cache memory line that has an asserted Z flag is received, the processing unit 205 does not return the data of the cache memory line in response to the read request. The asserted Z flag of the cache memory line to be read indicates that the cache memory line holds information values of zeros.

For clarity of illustration, the processing core 1 210 is assumed to clear or write a data value of zeros to a particular cache memory line in the L1 data cache memory 214. The processing core 1 210 asserts the Z flag associated with the particular cache memory line and sends a write zero request 510 to the cache memory tag directory 240. The cache memory tag directory 240 receives the write zero request 510 and searches its entries to determine if there are any copies of the particular cache memory line.

For clarity of illustration, the processing core n 230 is assumed to have a copy of the particular cache memory line cached in the L1 data cache memory 234. In this example, the cache memory tag directory 240 finds a matching entry of the copy of the particular cache memory line cached in the L1 data cache memory 234 and asserts the Z flag associated with the matching entry.

In one embodiment of the invention, the matching entry of the copy of the particular cache memory line may also have an asserted F flag. The cache memory tag directory 240 does not alter the status of the F flag and asserts the Z flag associated with the matching entry.

The cache memory tag directory 240 sends an invalidation request 520 to the processing core n 230 in one embodiment of the invention. The invalidation request 520 indicates to the processing core n 230 that it needs to change the state of the cache memory line in the L1 data cache memory 234 that is a copy of the particular cache memory line to an invalid state. After the state change is complete, the processing unit n 230 sends an acknowledgement 530 to the processing unit 1 210.

Figure 6:
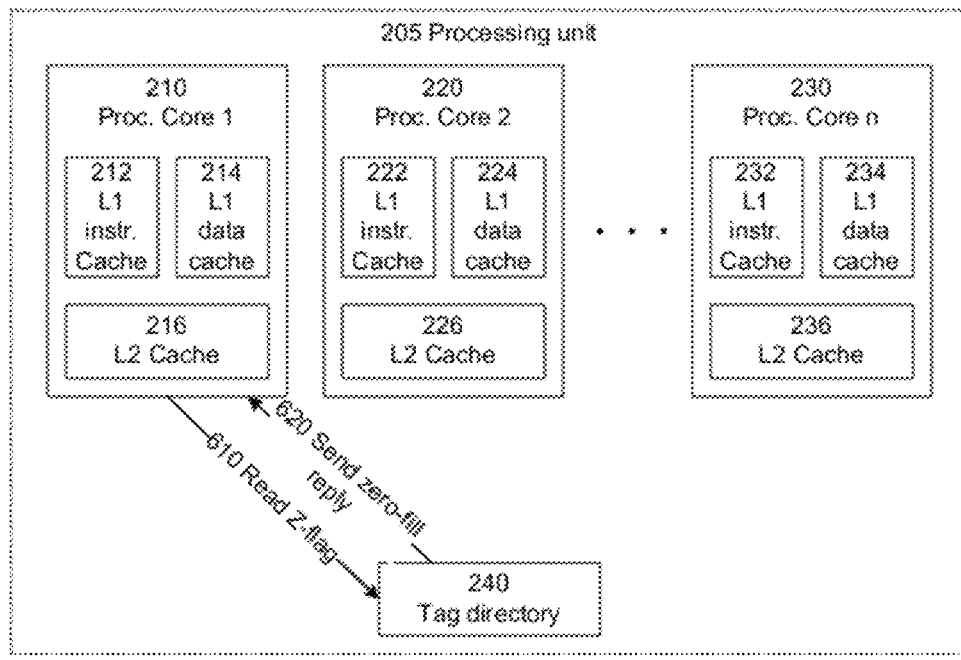
FIG. 6 illustrates an operation of reading a cache memory line that has an asserted Z flag in accordance with one embodiment of the invention.

FIG. 6 illustrates an operation 600 of reading a cache memory line that has an asserted Z flag in accordance with one embodiment of the invention. For clarity of illustration, the processing core 1 210 is assumed to have a cache memory miss when it has a read request of a particular cache memory line. It sends a read Z flag request 610 to determine if the particular cache memory line is cached in any of the other processing cores.

For clarity of illustration, the cache memory tag directory 240 is assumed to find a matching entry of a copy of the particular cache memory line and it determines that the Z flag of the copy of the particular cache memory line has been asserted.

The cache memory tag directory 240 sends a zero-fill reply 620 to the processing core 1 210 in one embodiment of the invention. The zero-fill reply indicates to the processing core 1 210 that the particular cache memory line has been cleared or has a data value of zeros. When the processing core 1 210 receives the zero-fill reply 620, it stores the particular cache memory line with a value of zero and sets its state to modified. The operation 600 does not require any data of zeros to be exchanged during the read operation and it reduces the power requirements of the processing unit 205.

In one embodiment of the invention, when a particular cache memory with an asserted Z flag is evicted from the tag-directory, instead of using a conventional 64 byte write command to memory, it uses a write-zero command which doesn't have to send data. In addition, if a particular cache memory with an asserted Z flag is kept in the Error Correction Code (ECC) or otherwise held in the memory, a read operation of the memory can also return zero-fill replys instead of sending 64 bytes of data. This allows savings of the power requirements of the processing unit 205.

In one embodiment of the invention, when the write-zero command and the EoU command are combined together, an asserted Z-flag means that a particular cache memory line has been declared EoU and the data can be represented as a zero value as it is useless information. In this embodiment, when a particular cache memory line with an asserted Z-flag is evicted from the cache memory tag directory, if it also has an asserted F-flag, the particular cache memory line is written back to the main memory using a write-zero command. If the particular cache memory line does not have an asserted F-flag, the particularly cache memory line can be silently evicted, i.e., it can be dropped without notifying the main memory.

Figure 7:
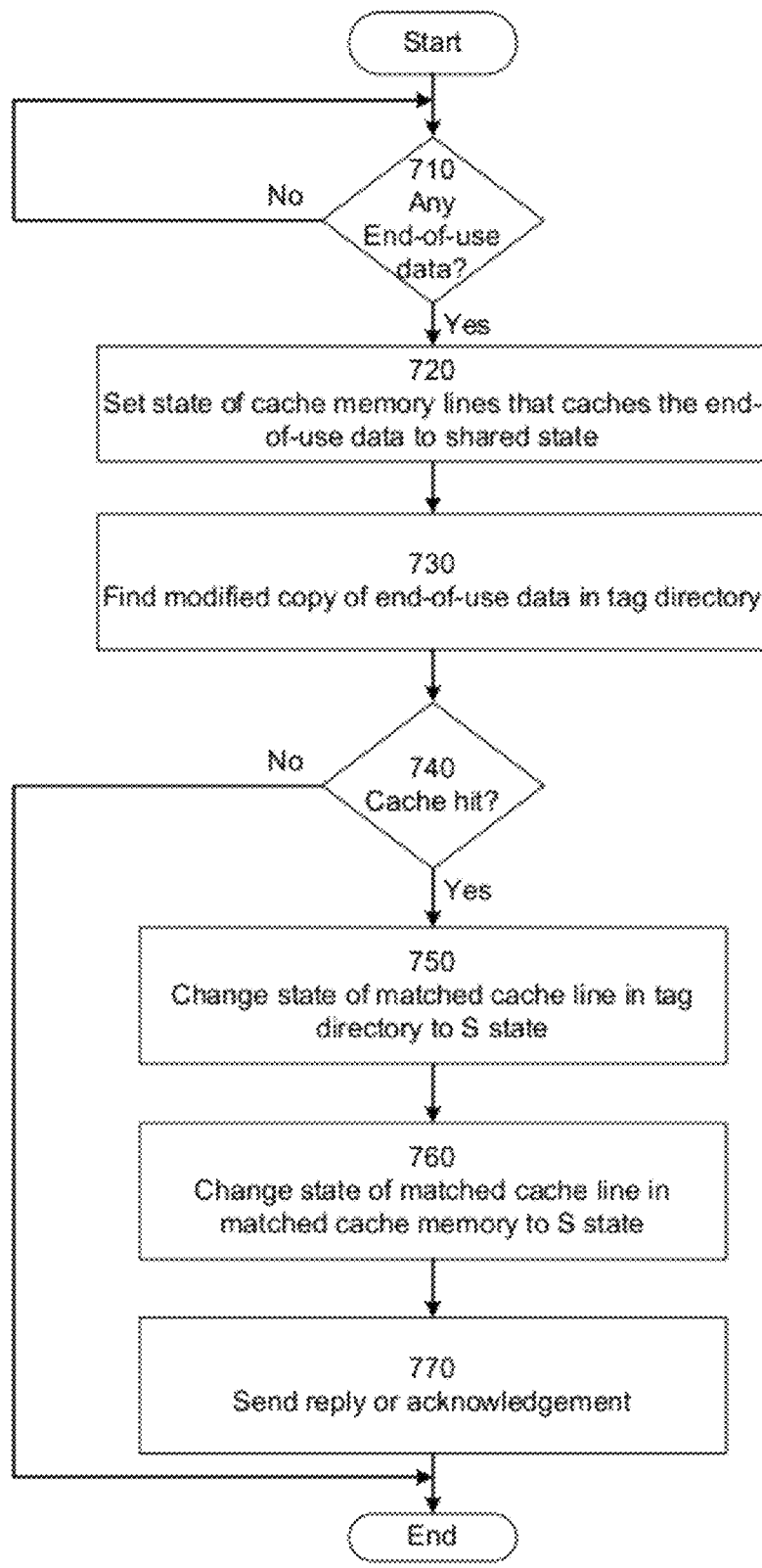
FIG. 7 illustrates a flow chart of the end-of-use operations in accordance with one embodiment of the invention.

FIG. 7 illustrates a flow chart 700 of the end-of-use operations in accordance with one embodiment of the invention. In step 710, the flow 700 checks if there are cache memory lines with cached data that can be declared as useless, end-of-life or end-of-use. In one embodiment of the invention, the step 710 is performed by checking whether an EoU command has been issued. In another embodiment of the invention, the step 710 is performed by checking whether a special input/output (I/O) register that holds the address of a particular cache memory line that stores useless information has been written. If no, the flow 700 goes back to step 710. If yes, the flow 700 goes to step 710 and sets the state of the cache memory lines that are caching the end-of-use data to the shared state.

In step 720, the flow 700 determines if there is any copy of the end-of-use data that is cached in another processing core. In one embodiment of the invention, the flow 700 checks the entries in a cache memory tag directory to find any copies of the cache memory lines that is caching the end-of-use data. In step 730, the flow 700 checks if there is any cache memory hit in the cache memory tag directory. If no, the flow 700 ends. If yes, the flow 700 goes to step 750 to change the state of the entry of the matched cache memory line in the cache memory tag directory to the shared state.

In step 760, the flow 700 changes the state of the copies of the cache memory lines in the matched cache memory to the shared sate. In step 770, the flow 700 sends a reply or acknowledgement that indicates that the state change is completed and the flow 700 ends.

Figure 8:
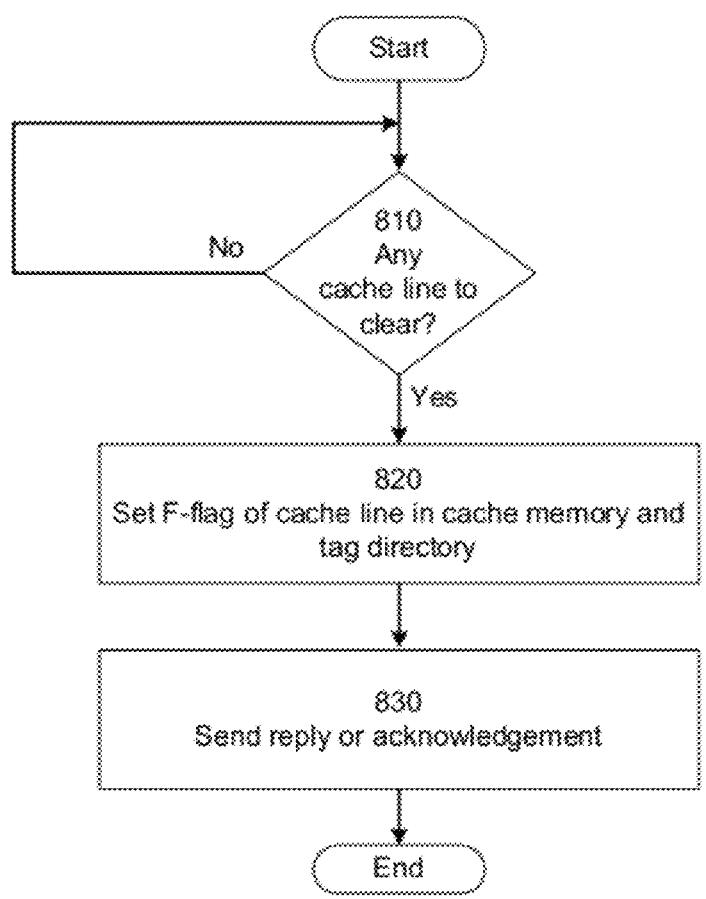
FIG. 8 illustrates a flow chart to set the F flag in accordance with one embodiment of the invention.

FIG. 8 illustrates a flow chart 800 to set the F flag in accordance with one embodiment of the invention. In step 810, the flow 800 checks if there any cache memory line that needs to be cleared or set to a data value of zero. If no, the flow 800 goes back to step 810. If yes, the flow 800 goes to step 820 to set the F flag of the cache memory line in the cache memory and the corresponding entry in a cache memory tag directory. In step 830, the flow 800 sends a reply or acknowledgement after the F flag is set and the flow 800 ends.

Figure 9:
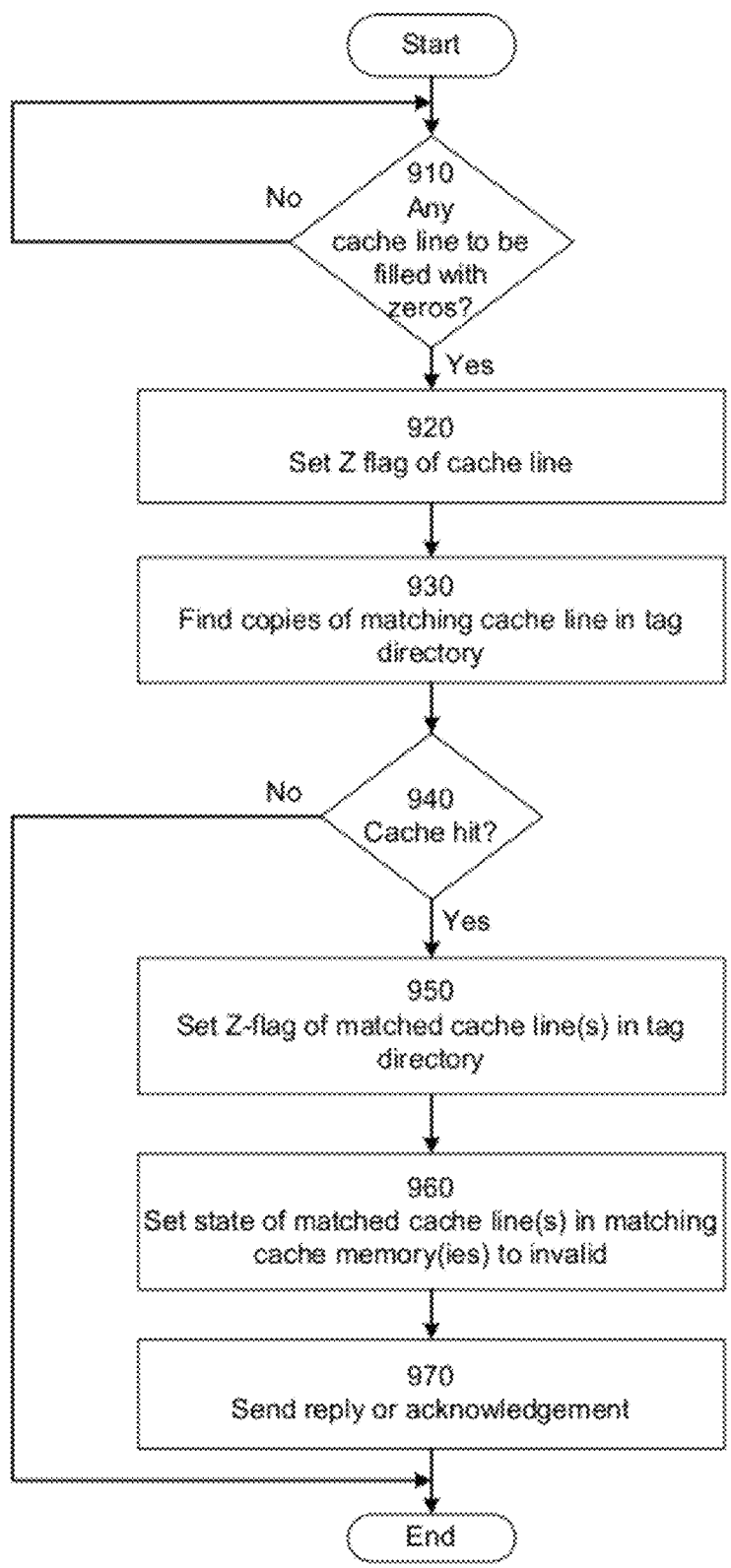
FIG. 9 illustrates a flow chart to set the Z flag in accordance with one embodiment of the invention.

FIG. 9 illustrates a flow chart 900 to set the Z flag in accordance with one embodiment of the invention. In step 910, the flow 900 checks if there are any cache memory lines that need to be filled with a data value of zero. If no, the flow 900 goes back to step 910. If yes, the flow 900 goes to step 920 and sets the Z flag of the cache memory lines that need to be filled with a data value of zero.

In step 930, the flow 900 determines if there is any copy of the cache memory lines that need to be filled with a data value of zero that is cached in another processing core. In one embodiment of the invention, the flow 900 checks the entries in a cache memory tag directory to find any copies of the cache memory lines that need to be filled with a data value of zero. In step 940, the flow 900 checks if there is any cache memory hit in the cache memory tag directory. If no, the flow 900 ends. If yes, the flow 900 goes to step 950 to set the Z flag of the entry of the matched cache memory line in the cache memory tag directory.

In step 960, the flow 900 sets the Z flag of the copies of the cache memory lines in the matched cache memory. In step 970, the flow 900 sends a reply or acknowledgement that indicates that the Z flag is asserted and the flow 900 ends.

Figure 10:
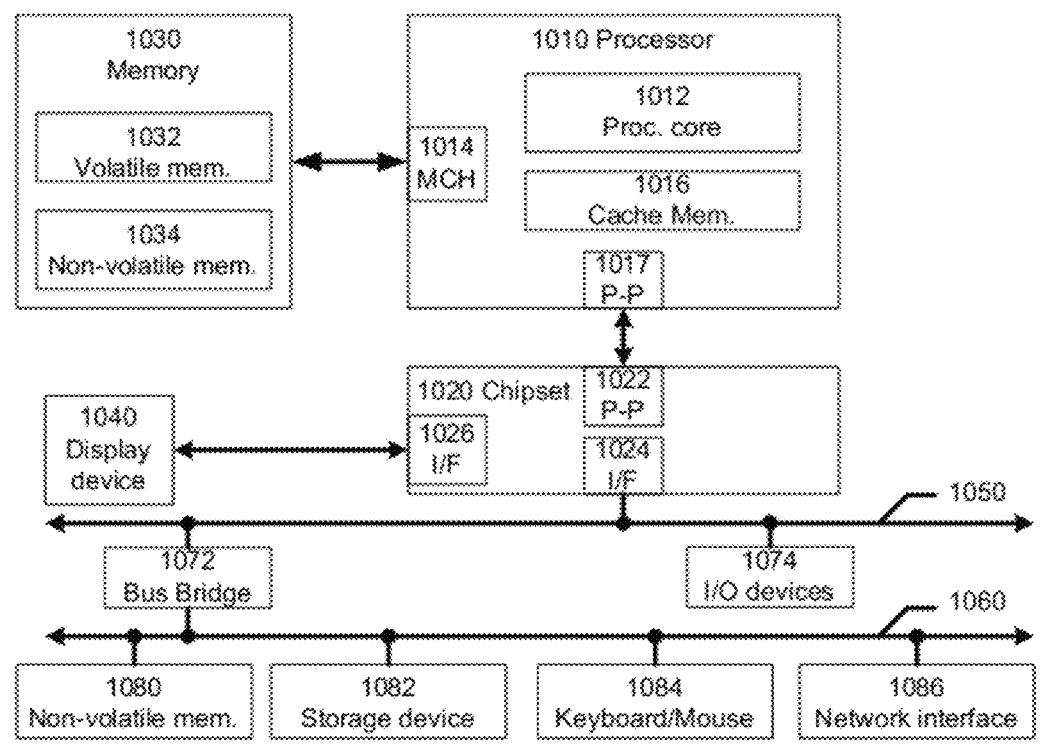
FIG. 10 illustrates a system in accordance with one embodiment of the invention.

FIG. 10 illustrates a system in accordance with one embodiment of the invention. The system 1000 includes, but is not limited to, a desktop computer, a laptop computer, a netbook, a notebook computer, a personal digital assistant (PDA), a server, a workstation, a cellular telephone, a mobile computing device, an Internet appliance or any other type of computing device. In another embodiment, the system 1000 used to implement the methods disclosed herein may be a system on a chip (SOC) system.

The processor 1010 has a processing core 1012 to execute instructions of the system 1000. The processing core 1012 includes, but is not limited to, pre-fetch logic to fetch instructions, decode logic to decode the instructions, execution logic to execute instructions and the like. The processor 1010 has a cache memory 1016 to cache instructions and/or data of the system 1000. In another embodiment of the invention, the cache memory 1016 includes, but is not limited to, level one, level two and level three, cache memory or any other configuration of the cache memory within the processor 1010. In one embodiment of the invention, the processor 1010 is able to execute end-of-use operations and to optimize the usage of the cache memory tag directory (not shown in FIG. 10).

The memory control hub (MCH) 1014 performs functions that enable the processor 1010 to access and communicate with a memory 1030 that includes a volatile memory 1032 and/or a non-volatile memory 1034. The volatile memory 1032 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 1034 includes, but is not limited to, NAND flash memory, NOR flash memory, phase change memory (PCM), read only memory (ROM), electrically erasable programmable read only memory (EEPROM), or any other type of non-volatile memory device.

The memory 1030 stores information and instructions to be executed by the processor 1010. The memory 1030 may also stores temporary variables or other intermediate information while the processor 1010 is executing instructions. The chipset 1020 connects with the processor 1010 via Point-to-Point (PtP) interfaces 1017 and 1022. The chipset 1020 enables the processor 1010 to connect to other modules in the system 1000. In one embodiment of the invention, the interfaces 1017 and 1022 operate in accordance with a PtP communication protocol such as the Intel® QuickPath Interconnect (QPI) or the like. The chipset 1020 connects to a display device 1040 that includes, but is not limited to, liquid crystal display (LCD), cathode ray tube (CRT) display, or any other form of visual display device.

In addition, the chipset 1020 connects to one or more buses 1050 and 1060 that interconnect the various modules 1074, 1080, 1082, 1084, and 1086. Buses 1050 and 1060 may be interconnected together via a bus bridge 1072 if there is a mismatch in bus speed or communication protocol. The chipset 1020 couples with, but is not limited to, a non-volatile memory 1080, a mass storage device(s) 1082, a keyboard/mouse 1084 and a network interface 1086. The mass storage device 1082 includes, but is not limited to, a solid state drive, a hard disk drive, an universal serial bus flash memory drive, or any other form of computer data storage medium.

The network interface 1086 is implemented using any type of well known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 10 are depicted as separate blocks within the system 1000, the functions performed by some of these blocks may be integrated within a single semiconductor circuit or may be implemented using two or more separate integrated circuits. For example, although the cache memory 1016 is depicted as a separate block within the processor 1010, the cache memory 1016 can be incorporated into the processor core 1012 respectively. The system 1000 may include more than one processor/processing core in another embodiment of the invention.

Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. An apparatus comprising:
    a first processing core including a first cache memory in which to store data processed by the first processing core; and
    a second processing core including a second cache memory in which to store data processed by the second processing core and, in part, by the first processing core;
    wherein the first processing core is to execute logic to:
       determine whether one or more cache memory lines of the first cache memory include end-of-life information; and
       change a state of a cache memory line of the one or more cache memory lines to a shared state when the cache memory line includes the end-of-life information, the shared state to indicate that the cache memory line is not to be written back to a main memory.

2. The apparatus of claim 1, further comprising a cache memory tag directory to ensure coherency between the first cache memory and the second cache memory, wherein the first processing core is further to execute the logic to send an end-of-use search request to the cache memory tag directory that includes an identification of the cache memory line and the shared state corresponding to the cache memory line.

3. The apparatus of claim 2, wherein the cache memory tag directory is further to, in response to the end-of-use search request:
    locate an entry within the cache memory tag directory that corresponds to the cache memory line stored in the second cache memory;
    change a state of the cache memory line of the entry to the shared state; and
    send a change request to the second processing core to also change the state of the cache memory line within the second cache memory to the shared state.

4. The apparatus of claim 1, wherein the first processing core is further to execute the logic to:
    determine whether the cache memory line is to be cleared and to be allocated for a new process; and at least one of:
       assert a first flag associated with the cache memory line, or
       evict the cache memory line to the main memory in response to receiving an eviction request.

5. The apparatus of claim 4, wherein the first processing core is further to execute the logic to:
    assert a second flag associated with the cache memory line in response to a determination that the cache memory line is to be cleared and to be allocated for the process;
    change the state of the cache memory line to an invalid state; and
    send a reply in response to changing the state of the cache memory line to the invalid state.

6. The apparatus of claim 5, wherein the first processing core is further to execute the logic:
    receive a read request of the cache memory line, wherein the second flag associated with the cache memory line is asserted;
    send a zero-fill request in response to the read request; and
    fill the cache memory line with a value of zero.

7. The apparatus of claim 1, wherein the first cache memory comprises one or more of a level one cache memory, a level two cache memory, and a level three cache memory.

8. An apparatus comprising:
    a first processing core and a second processing core each having at least one cache memory; and
    a cache memory tag directory operatively coupled with the first processing core and the second processing core;
    wherein each of the first processing core and the second processing core is to:
       receive an instruction, from the cache memory tag directory, to clear a cache memory line of the at least one cache memory;
       determine whether one or more entries in the cache memory tag directory match a cache memory line of the at least one cache memory in response to receipt of the instruction to clear the cache memory line; and
       assert a first flag associated with the one or more entries in the cache memory tag directory in response to a determination that the one or more entries in the cache memory tag directory match the cache memory line, wherein the first flag is to indicate that the cache memory line is not to be written back to a main memory.

9. The apparatus of claim 8, wherein each of the first processing core and the second processing core is further to:
    change a state of each cache memory line that corresponds to the one or more entries in the cache memory tag directory to an invalid state; and
    send a reply in response to the change in the state of each cache memory line that corresponds to the one or more entries in the cache memory tag directory to the invalid state.

10. The apparatus of claim 9, wherein each of the first processing core and the second processing core is further to store data that indicates that the cache memory line that corresponds to the one or more entries in the cache memory tag directory has a zero value only in the cache memory tag directory in response to the change in the state of the cache memory line that corresponds to the one or more entries in the cache memory tag directory to the invalid state.

11. The apparatus of claim 10, wherein one processing core of the first processing core and the second processing core is further to:

send a read request of the cache memory line that corresponds to the one or more entries in the cache memory tag directory that has a zero value only in the cache memory tag directory;
determine whether the one or more entries in the cache memory tag directory match the cache memory line of the read request;
write a data value of zero to the cache memory line of the read request in one of the at least one cache memory of the one processing core; and
indicate that the one processing core has a copy of the cache memory line of the read request in the cache memory tag directory.

12. The apparatus of claim 10, wherein the first flag associated with the cache memory line that corresponds to the one or more entries in the cache memory tag directory that has a zero value only in the cache memory tag directory is to indicate that information stored in the cache memory line includes information that need not be further accessed by the first processing core and the second processing core.

13. The apparatus of claim 12, wherein each of the first processing core and the second processing core is further to:
determine whether the cache memory line is to be cleared and to be allocated for a new process; and
assert a second flag associated with the one or more entries in the cache memory tag directory in response to the determination that the cache memory line is to be cleared and to be allocated for the new process.

14. The apparatus of claim 13, wherein each of the first processing core and the second processing core is further to:
receive an eviction request of a cache memory line that has the first flag and the second flag; and
write information of the cache memory line that has the first flag and the second flag back to the main memory.

15. The apparatus of claim 13, wherein each of the first processing core and the second processing core is further to:
receive an eviction request of a cache memory line that has the first flag and the second flag;
remove an entry associated with the cache memory line that has the first flag and the second flag from the cache memory tag directory;
deassert the second flag; and
refrain from writing information of the cache memory line that has the first flag and the second flag to a main memory.

16. The apparatus of claim 8, wherein each of the first processing core and the second processing core is further to:
receive a read request of the at least one cache memory, wherein the first flag associated with the one or more entries in the cache memory tag directory is asserted;
send a zero-fill request in response to the read request; and
fill each of a plurality of cache memory lines of the at least one cache memory with a value of zero.

17. The apparatus of claim 8, wherein each of the first processing core and the second processing core is further to:
determine whether one or more cache memory lines of the at least one cache memory include end-of-life information; and
change a state of the one or more entries in the cache memory tag directory to a shared state in response to the determination that the one or more entries in the cache memory tag directory match the one or more cache memory lines, the shared state to indicate that the cache memory line is not to be written back to a main memory.

18. The apparatus of claim 17, wherein each of the first processing core and the second processing core is further to:
change a state of each cache memory line that corresponds to the one or more entries in the cache memory tag directory to the shared state; and
send a reply to the tag directory in response to the change of the state of each cache memory line that corresponds to the one or more entries in the cache memory tag directory to the shared state.

19. The apparatus of claim 8, wherein the at least one cache memory comprise one or more of a level one cache memory, a level two cache memory, and a level three cache memory.

20. A method comprising:
accessing, by a first processing core, data stored in a first cache memory of the first processing core;
accessing, by a second processing core, data stored in a second cache memory of the second processing core;
determining whether one or more cache memory lines of the first cache memory include end-of-life information; and
transitioning a state of a cache memory line of the one or more cache memory lines to a shared state when the cache memory line includes the end-of-life information, the shared state to indicate that the cache memory line is not to be written back to a main memory.

21. The method of claim 20, further comprising sending an end-of-use search request to a cache memory tag directory that includes an identification of the cache memory line and the shared state corresponding to the cache memory line, wherein the cache memory tag directory ensures coherency between the first cache memory and the second cache memory.

22. The method of claim 21, further comprising the cache memory tag directory:
locating an entry within the cache memory tag directory that corresponds to the cache memory line stored in the second cache memory;
changing a state of the cache memory line of the entry to the shared state; and
sending a change request to the second processing core to also change the state of the cache memory line within the second cache memory to the shared state.

23. The method of claim 20, further comprising:
determining whether the cache memory line is to be cleared and to be allocated for a new process; and at least one of:
asserting a first flag associated with the cache memory line, or
evicting the cache memory line to the main memory in response to receiving an eviction request.

24. The method of claim 23, further comprising:
asserting a second flag associated with the cache memory line in response to a determination that the cache memory line is to be cleared and to be allocated for the process;
changing the state of the cache memory line to an invalid state; and
sending a reply in response to changing the state of the cache memory line to the invalid state.

25. The method of claim 24, further comprising:
receiving a read request of the cache memory line, wherein the second flag associated with the cache memory line is asserted;
sending a zero-fill request in response to the read request; and
filling the cache memory line with a value of zero.

26. The method of claim 20, wherein the first cache memory comprises one or more of a level one cache memory, a level two cache memory, and a level three cache memory.

* * * * *